United States Patent [19]

Welch

[11] 4,242,480
[45] Dec. 30, 1980

[54] CATALYST AND PROCESS OF POLYMERIZATION OF ALPHA MONOOLEFINS

[75] Inventor: M. Bruce Welch, Bartlesville, Okla.

[73] Assignee: Phillips Petroleum Company, Bartlesville, Okla.

[21] Appl. No.: 860,263

[22] Filed: Dec. 13, 1977

[51] Int. Cl.$^3$ .......................... C08F 4/02; C08F 10/06
[52] U.S. Cl. ................................ 526/125; 252/429 B; 526/114; 526/351; 526/352; 526/903; 526/906
[58] Field of Search ................... 526/114, 125, 906

[56] References Cited

U.S. PATENT DOCUMENTS

| | | | |
|---|---|---|---|
| 3,062,801 | 11/1962 | Hoeg et al. | 526/906 |
| 3,875,126 | 4/1975 | Toshiro et al. | 526/906 |
| 4,020,264 | 4/1977 | Hotta et al. | 526/906 |
| 4,071,672 | 1/1978 | Kashiwa | 526/125 |
| 4,142,991 | 3/1979 | Arzoumanidis | 526/125 |

FOREIGN PATENT DOCUMENTS

| | | | |
|---|---|---|---|
| 2342200 | 3/1974 | Fed. Rep. of Germany . | |
| 2552120 | 5/1976 | Fed. Rep. of Germany | 526/903 |
| 2633195 | 1/1977 | Fed. Rep. of Germany | 526/125 |
| 2644440 | 4/1977 | Fed. Rep. of Germany | 526/125 |
| 1387890 | 3/1975 | United Kingdom | 526/125 |
| 1435768 | 5/1976 | United Kingdom . | |

*Primary Examiner*—Edward J. Smith

[57] ABSTRACT

Polymerization of alpha monoolefins employing a catalyst comprising (A) a component formed by intensive mixing (milling) of titanium halide, a Lewis base, anhydrous magnesium or manganese chloride, and an unsaturated additive, (B) trihydrocarbylaluminum and, optionally, a Lewis base, and optionally (C) a dihydrocarbyl aluminum halide.

38 Claims, No Drawings

CATALYST AND PROCESS OF POLYMERIZATION OF ALPHA MONOOLEFINS

FIELD OF THE INVENTION

The invention relates to a titanium based catalyst system. In another aspect, the invention pertains to a process for the polymerization of alpha monoolefins.

BACKGROUND OF THE INVENTION

In the field of polymerization of alpha monoolefins, such as propylene, or ethylene, to produce useful polymers, a continuing objective is an increase in productivity relative to the amount of catalyst employed. Productivity is highly important in order to keep to a minimum the amount of residual catalytic materials to be removed from the resulting polymer which is almost always a necessity, and generally is a troublesome or relatively expensive procedure to carry out.

In another aspect, the normally desired polymer is a solid polymer, and minimization of the formation of "solubles", i.e. amorphous or atactic polymer, is a much to be desired objective. Most amorphous polymer is considered an undesirable byproduct, which either degrades the character of the total product, or else must be removed by treating with such as hexane, to recover the more valuable solid polymer for exploitation.

Thus, it is desired to provide polymerization processes, and catalysts, effective in improving the productivity of the polymerization of alpha monoolefins, and also to minimize the formation of solubles.

BRIEF DESCRIPTION OF THE INVENTION

I have discovered a catalyst, and a process of polymerization of alpha monoolefins employing the catalyst, in which the catalyst comprises (A) a milled admixture of a titanium halide, a Lewis base, magnesium or manganous chloride, and an unsaturated additive, (B) a trihydrocarbylaluminum, optionally also with a Lewis base, and optionally (C) a dihydrocarbylaluminum halide. More preferably, my catalyst system will consist essentially of the described components.

My two or three-component catalyst system is effective in the polymerization of aliphatic alpha-monoolefins either in homopolymerizations, or in copolymerizations. In such polymerizations, employing my two, optionally three, component catalyst system, in the polymerization of ethylene, the second component (B) normally will not contain the Lewis base. However, in polymerization of the higher alpha monoolefins the Lewis base presently is preferred to be included in the second component (B). The third component (C) presently is considered optional in the polymerizations, though preferred, particularly for the purpose of improving production of propylene polymers.

DETAILED DESCRIPTION OF THE INVENTION MONOMERS

In the polymerization process in accordance with one aspect of my invention, my catalyst is effective for the polymerization of aliphatic hydrocarbon alpha-monoolefins (1-monoolefins) polymerizable with titanium-based catalyst systems. These aliphatic 1-monoolefins can be represented by $RCH=CH_2$ in which R is hydrogen or an alkyl radical. It is presently preferred, as a matter of availability and not a limitation on operability of my process, to employ the 1-monoolefins of 2 to 8 carbon atoms per molecule, though 1-monoolefins of greater numbers of carbon atoms can be polymerized in accordance with my process.

Exemplary 1-monoolefins include ethylene, propylene, butene-1, isobutylene, 3-methylbutene-1, pentene-1, hexene-1, octene-1, decene-1, and the like, alone, or in admixture. Propylene is a presently preferred monomer.

CATALYST SYSTEM

My catalyst system comprises a two-component, optionally three-component, catalyst system. The catalyst system includes (A) a milled-admixture of titanium halide, Lewis base, anhydrous magnesium or manganous chloride, and an unsaturated additive; (B) a trihydrocarbylaluminum compound, and, preferably, a further Lewis base, though this latter can be absent in the case of ethylene homopolymerization, i.e. in ethylene homopolymerization and ethylene/1-monoolefin copolymerizations in which ethylene constitutes at least about 80 mole % of the copolymer; and (C) optionally, though preferably, is included a dihydrocarbylaluminum halide, especially when polymerizing propylene. The Lewis base employed in component (B) can be but need not be the same as the Lewis base employed in component (A).

COMPONENT (A)

Titanium Halide

The titanium halide can be any of the di, tri, or tetrahalides of titanium, wherein the halogen can be bromine, chlorine, or iodine. These can be represented by $TiX_{4-n}R_n'$, wherein X is the halogen, usually chlorine or bromine; R' is alkyl, cycloalkyl, aryl, aryloxy, or alkoxy, or combinations preferably of 2 to 8 carbon atoms; and n is 0 or an integer of 1 to 3. Exemplary species include titanium tetrachloride, trichloro-n-octyltitanium, trichlorophenoxytitanium, dibromodimethyltitanium, tribromocyclohexyltitanium, trichlorocyclohexyloxytitanium, iodotriethoxytitanium, and the like, alone, or in admixture. Presently preferred is titanium tetrachloride because of its ready availability and relatively low cost.

LEWIS BASE

The Lewis base can be any of the compounds meeting the commonly accepted definition of a Lewis base, otherwise described as an electron donor compound.

Generally, any of the amines, amides, ethers, esters, carboxylic acids, ketones, nitriles, phosphines, or the like, known as Lewis bases, are suitable. For example, the Lewis base can be selected from aliphatic carboxylic acids, aromatic carboxylic acids, alkylesters of aliphatic carboxylic acids, alkylesters of aromatic carboxylic acids, aliphatic ethers, aromatic ethers, aliphatic ketones, aromatic ketones, aliphatic aldehydes, aliphatic alcohols, aromatic alcohols, aliphatic acid halides, aliphatic nitriles, aromatic nitriles, aliphatic amines, aromatic amines, aliphatic phosphines, aromatic phosphines, amides, those of mixed character, and the like, alone, or in admixture.

Exemplary amines $R_2''NH$, $R''NH_2$, and $R_3''N$ include triethylamine, triphenylamine, diphenylamine, and the like. Exemplary amides $R''CONH_2$ and $R''CONHR''$ include acetamide, butyramide, acetanilide, and the like. Exemplary ethers $R''OR''$ include dimethyl ether, diethyl ether, ethylbutylether, dicyclohexylether, diphenyl ether, and the like. Exemplary carboxylic acids

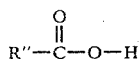

include acetic acid, benzoic acid, and the like, and their corresponding esters

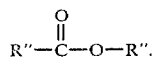

Exemplary ketones

include acetone, methyl n-butyl ketone, acetophenone, and the like. Exemplary nitriles R"CN include acetonitrile, isobutyronitrile, benzonitrile, and the like. Exemplary phosphines

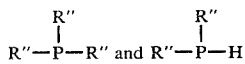

include tributylphosphine, propyl(n-pentyl)phosphine, triphenylphosphine, and the like. R" is a hydrocarbon group and is alkyl, cycloalkyl, or aryl, preferably of 1 to 12 carbon atoms for convenience.

Presently preferred are the esters, and most preferred are the esters of aromatic carboxylic acids wherein the moiety derived from the alcohol is an aliphatic moiety, because the resulting catalysts exhibit high activity and good stereospecificity in polymerizing the monomers. These preferred esters can be represented by the formula:

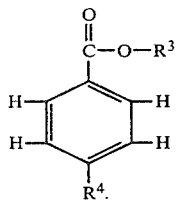

In the above formula $R^3$ represents an alkyl group of 1 to 4 carbon atoms; $R^4$ represents a para-substituent on the ring and is a monovalent radical selected from —H, —F, —Cl, —Br, —I, —OH, —$OR^2$, —$OOCR^2$, —SH, —$NH_2$, —$NHR^2$, —$NR_2^2$, —$NR^2COR^2$, —$NHCOR^2$, $NO_2$, —CN, —CHO, —$COR^2$, —$COOR^2$, —$CONH_2$, $CONR_2^2$, —$SO_2R^2$, and —$CX_3'$ where X'=F, Cl, Br, I, or hydrogen.

Exemplary esters include ethyl benzoate, ethyl anisate (p-methoxybenzoate), ethyl p-dimethylaminobenzoate, ethyl p-fluorobenzoate, ethyl p-cyanobenzoate, methyl benzoate, isopropyl p-diethylaminobenzoate, butyl p-fluorobenzoate, n-propyl p-cyanobenzoate, ethyl p-trifluoromethylbenzoate, methyl p-hydroxybenzoate, ethyl p-methoxycarbonylbenzoate, methyl p-acetylbenzoate, isopropyl p-formylbenzoate, methyl p-nitrobenzoate, ethyl p-carbamoylbenzoate, methyl p-mercaptobenzoate, methyl p-chlorobenzoate, n-butyl-p-bromobenzoate, isopropyl p-iodobenzoate, ethyl p-aminobenzoate, n-propyl p-methylaminobenzoate, methyl-p-acetamidobenzoate, n-butyl p-formylbenzoate, dimethyl terephthalate, ethyl p-(N,N-dimethylcarbamoyl)benzoate, n-propyl p-(methylsulfonyl)benzoate, methyl p-trifluoromethylbenzoate, ethyl p-acetoxybenzoate, and mixtures.

Presently preferred are ethyl benzoate and ethyl anisate, since particularly highly active catalysts are produced therewith which exhibit very good stereospecificity in polymerizing the 1-monoolefins described previously.

MAGNESIUM OR MANGANOUS CHLORIDES

Magnesium or manganous chloride, or both, are employed in the first component (A) of my catalyst system. Presently, magnesium chloride is preferred because of ready availability, low cost, low toxicity, and because more active catalysts are formed in its presence.

UNSATURATED COMPOUND

The unsaturated compound employed in the (A) component of my catalyst system is an unsaturated aliphatic or alicyclic hydrocarbon or unsaturated halogenated aliphatic or alicyclic hydrocarbon compound, wherein the unsaturation is monoolefinic, diolefinic, or acetylenic, and which can contain aryl hydrocarbyl substituents. As far as operability is concerned, there presently appear no limits as to molecular size. Presently preferred are those unsaturated compounds of 2 to 20 carbon atoms, more preferably 2 to 12 carbon atoms, and presently most preferred are those of 3 to 10 carbon atoms per molecule, because of ready availability.

Exemplary unsaturated compounds include ethylene, propylene, hexene-1, 4-methyl-cis-pentene-2, 2,3-dimethylbutene-1, neohexene, octene-1, diisobutylene, dodecene-1, 1,5-octadiene, 1,3,5-heptatriene, heptyne-1, hexyne-1, phenylacetylene, trichloroethylene, tetrachloroethylene, and the like, alone, or in admixture.

Presently preferred unsaturated components are the monoolefins since they presently have shown most effectiveness in reduced soluble-polymer formation, increased productivities, and result in a dry powdery catalyst easily recoverable from vibratory vessels. This last characteristic is dependent on the amounts of monoolefin used since too much liquid in the mill could result in an undesirably wet muddy catalyst. However, this normally is not a problem since quite small amounts of monoolefin result in catalysts with good productivities and low soluble-polymer formation.

Of the monoolefins, presently preferred are hexene-1 and octene-1, and of these presently most preferred is hexene-1, due to results observed and because of ready availability and relative low-cost.

PREPARATION OF COMPONENT (A)

The magnesium chloride, manganous chloride, or both, are employed substantially anhydrous, and in the form of a finely divided powder. The magnesium or manganous chloride can be preactivated by a grinding operation prior to the milling step used to form component (A), though this preactivation is not considered generally necessary.

While the ratio of the components in forming the first component (A) of my catalyst system can range widely as long as the final catalyst is effective, presently considered exemplary is a molar ratio of titanium halide:Lewis base in the range of about 0.5:1 to 4:1, presently preferred about 0.7:1 to 2:1 because stereospecificity is more favored, especially when polymerizing propylene.

The molar ratio of the magnesium or manganous chloride, or both, to the titanium halide compound can range widely, as may be desired, as long as the final catalyst is effective, though presently considered exemplary is a weight ratio of magnesium chloride or manganous chloride:titanium compound in the range of about 4:1 to 40:1, presently preferred about 5:1 to 20:1 because catalyst activity is particularly good in that range.

The quantity of unsaturated component incorporated in the catalyst component (A) can range widely, so long as it is that amount effective to produce the catalytic results desired. An exemplary amount is in the range of about 1 to 20 weight percent based on the weight of the unsaturated component plus other components in (A), thus based on the total weight of catalyst component (A), more preferably about 1.5 to 15 weight percent because in this range a dry free-flowing composite is readily obtained which does not form agglomerates or adhere to the milling vessel walls. The unsaturated components employed in the catalyst component (A) preferably are liquids at room temperatures and as such are easily handled, though gaseous compounds can be employed if desired, for example, propylene or other normally gaseous unsaturated reactant.

Usually, the anhydrous magnesium chloride or manganous chloride is added to the milling means prior to addition of the other ingredients of component (A), though the order of addition is not critical. The Lewis base and the titanium halide can be charged separately to the milling means, or can be premixed together to form an admixture, which may form an addition compound or complex of a Lewis base with the titanium compound, and this then can be charged to the milling means. Generally, it is more convenient to charge the unsaturated compound to the mill containing the other components to facilitate mixing.

The components for catalyst component (A) are admixed in a suitable milling means under intensive milling conditions. The milling employed is to be distinguished from ordinary admixing, shaking, or tumbling, or the like. The milling refers to the strong and thorough mixing of the several ingredients together, milling under milling conditions, in such a manner as to afford significant reduction in the particle size. Milling can be by means of a ball mill, vibrating ball mill, tower mill, or the like. A typical specific mill employable is a vibratory mill such as a Vibratom, manufactured by Siebtechnik G.M.B.H.

Milling can employ ambient, vacuum or other subatmospheric, or superatmospheric, pressure, in an inert, dry, atmosphere such as nitrogen, argon, or the like. Milling may result in heat being produced, and where needed cooling means can be employed to avoid excessive temperatures over such as about 150° F. (65° C.) which could adversely affect catalyst performance. Milling times can range widely, such as from about 5 to 200 hours, presently preferred about 10 to 175 hours because the catalysts are sufficiently activated after such milling times. No advantage in activity is gained by exceeding the specified times. Vibratory milling typically takes a shorter time. Roll milling typically takes a longer time.

COMPONENT (B)

Component (B) comprises a trihydrocarbylaluminum compound, and except in the case of ethylene homopolymerizations further includes a further Lewis base. In the case of ethylene homopolymerizations, component (B) optionally though not preferably can include the further Lewis base.

The trihydrocarbylaluminum compound can be represented by the formula $AlR_3^2$ wherein each $R^2$ is as previously defined. Exemplary trihydrocarbyl aluminum compounds include trimethylaluminum, triethylaluminum, tri-n-dodecylaluminum, dimethylethylaluminum, triphenylaluminum, tri-cycloheptylaluminum alone, or in admixture. Triethylaluminum presently is preferred because of its ready availability and particular effectiveness in my catalyst and process.

The further Lewis base component of component (B) can be selected from any of those described hereinabove as Lewis bases.

The ratio of the trihydrocarbylaluminum compound to the further Lewis base, where employed, can range widely so long as the final catalyst is effective. Presently considered exemplary is a molar ratio of about 0.5:1 to 100:1, presently preferred about 1:1 to 8:1 because active catalyst systems displaying excellent stereospecificity, especially during propylene polymerization, are produced. The preferred further Lewis bases for my catalyst component (B) again are the aromatic esters, and presently most preferred are ethyl anisate and ethyl benzoate because of ready availability and effectiveness, particularly in propylene polymerization.

COMPONENT (C)

Component (C) is an optional, though presently preferred component in propylene polymerization because of improvement in productivity and is a dialkylaluminum halide. These can be represented as $AlR_2^5X^2$, in which each $R^5$ is an alkyl radical, preferably containing 1 to 12 carbon atoms per $R^5$ radical, and $X^2$ is a halogen atom and can be fluorine, chlorine, bromine, or iodine, though presently preferred are chlorine or bromine because of availability.

Exemplary compounds include dimethylaluminum bromide, diethylaluminum chloride, diethylaluminum fluoride, di-n-propylaluminum iodide, ethyl-t-butylaluminum bromide, bis(2-ethylhexyl)aluminum chloride, bis-n-dodecylaluminum chloride, alone, or in admixture. Diethylaluminum chloride presently is preferred because of ready availability, purity and particular effectiveness in the process.

CATALYST COMPONENT RATIOS

The ratios of catalyst components (A):(B), and optionally further (C) where employed, can range widely so long as the results desired are obtained and the ratios are effective to function as catalytic ratios. Presently considered exemplary are weight ratios of (A):(B) of about 0.01:1 to 0.5:1, presently preferred about 0.02:1 to 0.3:1 because the catalytic systems are particularly active and stereospecific in these ranges, particularly for propylene polymerization.

Considered exemplary are molar ratios of dihydrocarbylaluminum halide:titanium halide in the range of about 0.5:1 to 200:1, more generally and preferred about 2:1 to 150:1 because polymer productivity is particularly enhanced in this range. The molar ratio of (C):(B) can range from about 0.05:1 to 20:1, preferably about 0.25:1 to 4:1.

POLYMERIZATION CONDITIONS

The catalyst components can be individually introduced into the polymerization reaction zone. The desired amounts can be added directly, or flushed in with portions of diluent, as may be convenient. The particular order of addition to the polymerization reactor means does not appear to be critical. Components (A), (B), and (C) are not premixed before charging to the reactor. Any order of charging can be employed.

Polymerization can be carried out under conditions known in the art, such as in a liquid phase in the presence or absence of a diluent substantially inert under the reaction conditions employed, or reactions can be carried out in the vapor phase.

It presently is preferred to polymerize propylene in liquid propylene in the absence of an inert diluent because separation of components is simplified and good results are obtained.

Ethylene presently is preferably polymerized in a diluent, though other alpha monoolefins conveniently need not be. Typical suitable diluents include n-butane, isobutane, pentane, n-hexane, n-heptane, n-octane, cyclohexane, methylcyclohexane, and the like, or other saturated aliphatic hydrocarbons, alone, or in admixture.

Polymerization temperatures employed can range widely, as convenient and desirable for the equipment, monomer, and the like. Exemplary temperatures of polymerization lie in the range of about $-80°$ C. to $150°$ C., presently preferred about $15°$ C. to $100°$ C. Polymerization temperatures can vary somewhat depending on the particular monomer, employment of diluent, and the like. For example, the polymerization of propylene using liquid propylene phase conveniently is carried out in the range of about $24°$ C. to $80°$ C., presently preferred about $49°$ C. to $71°$ C. because of better results with regard to productivity and solubles.

Polymerization pressures can range widely, as convenient, depending on whether vapor phase or liquid phase conditions are employed, whether diluent is employed, and the like. Where liquid phase operation is desired, with or without diluent, the pressure employed should be sufficient to maintain reactants and diluent substantially in the liquid phase.

Control of the molecular weight of the polymeric product can be exerted by maintaining small amounts of hydrogen during polymerization, and this normally is considered advantageous. The presence of hydrogen tends to decrease the molecular weight of the polymeric products.

The polymerization process can be conducted either continuously, or batchwise, as may be convenient depending on desired output, equipment, and the like.

The amount of catalyst employed in the polymerization conveniently can be related to the amount of component (A) employed. The amount of my catalyst component (A) employed relative to the reaction mixture can vary from about 0.001 to 1 weight percent. This is the total of all four components in (A). Generally, about 0.001 to 0.01 weight percent is employed in polymerizing propylene in liquid propylene, for example. The term "reaction mixture" includes the polymerization charge of monomer, and diluent if any.

Of course, the catalyst components employed are, to some extent, sensitive to poisons, such as water, air and the like. Equipment, diluent, alpha-monoolefin, and the like, all should be maintained in substantially anhydrous conditions, or dried prior to employment. An atmosphere inert to the components should be employed, such as nitrogen, argon, helium, n-hexane and the like. Polymerization starts almost immediately on combination of the catalyst components with the monomer and is substantially complete generally within about 2 hours.

After completion of the polymerization reaction, or after suitable residence time in the reaction zone to obtain desired conversion, the contents of the reactor means then are discharged. The catalyst can be inactivated by treating with an agent such as a lower alcohol such as ethanol or methanol, the mixture then separated, and the polymer isolated. The polymer recovered can be purified as desired by such as drying under vacuum, and the like. The polymeric product can be treated for removal of solubles by contacting with hot n-hexane, n-heptane, etc. which dissolves the soluble amorphous material and leaves a white, solid, predominantly crystalline polymer as the final product.

EXAMPLES

The examples provided are designed to assist one skilled in the art to a further understanding of the invention, without limiting the scope of the invention. Particular reactants, components, ratios, conditions employed, are intended to be exemplary and not limitative of the reasonable scope of the invention herein described, of which these examples are a part of my overall disclosure.

EXAMPLE I

A series of catalyst systems were prepared. In each instance, catalyst component (A) was prepared by separately charging to a 1 liter spherical stainless steel vessel containing about 2.5 kg of $\frac{1}{2}$ inch (1.3 cm) stainless steel balls, magnesium chloride ($MgCl_2$) previously dried for about 6 hours at $800°$ F. ($426°$ C.) and ball milled for 5 days on a vibrating mill, titanium tetrachloride ($TiCl_4$), ethyl benzoate (EB), a specified unsaturated hydrocarbon or halogenated unsaturated hydrocarbon (HC), followed by ball milling the mixture for 24 hours at ambient temperature without employing cooling, unless indicated otherwise.

The quantities of each compound used, calculated weight percentage of each component, and calculated mole ratio of titanium tetrachloride to ethyl benzoate are given in Table 1. Control catalyst 25 was made following the above general procedure except that the solid hydrocarbon, durene, was used in its preparation.

Table I

Catalyst Component "A" Preparation

| Run No. | Grams | | | | $MgCl_2$ wt./% | $TiCl_4$ wt./% | EB wt./% | HC wt./% | Mole Ratio $TiCl_4$/EB |
| --- | --- | --- | --- | --- | --- | --- | --- | --- | --- |
| | $MgCl_2$ | $TiCl_4$ | EB | HC | | | | | |
| 1 (1) | 60.3 | 18.6 | 14.9 | propylene vapor flush | 63.1 | 19.5 | 15.6 | 1.8 | 1 |
| 2 | 60.3 | 18.6 | 14.9 | neohexene, 8.3 (2) | 59.1 | 18.2 | 14.6 | 8.1 | 1 |
| 3 | 60.3 | 18.6 | 14.9 | octene-1, 8.0 | 59.2 | 18.3 | 14.6 | 7.9 | 1 |
| 4 | 60.3 | 23.1 | 14.9 | octene-1, 8.0 | 56.7 | 21.7 | 14.0 | 7.5 | 1.2 |
| 5 | 60.3 | 18.6 | 14.9 | 4-methylpentene-1, 8.0 | 59.2 | 18.3 | 14.6 | 7.9 | 1 |
| 6 | 60.3 | 18.6 | 0 | cis-4-methylpentene-2, 8.0 | 69.4 | 21.4 | 0 | 9.2 | na (5) |
| 7 | 60.3 | 18.6 | 14.9 | cis-4-methylpentene-2, 8.0 | 59.2 | 18.3 | 14.6 | 7.9 | 1 |

Table I-continued

Catalyst Component "A" Preparation

| Run No. | Grams MgCl$_2$ | TiCl$_4$ | EB | HC | | MgCl$_2$ wt./% | TiCl$_4$ wt./% | EB wt./% | HC wt./% | Mole Ratio TiCl$_4$/EB |
|---|---|---|---|---|---|---|---|---|---|---|
| 8 | 60.3 | 18.6 | 14.9 | diisobutylene, | 11.0 (3) | 57.6 | 17.7 | 14.2 | 10.5 | 1 |
| 9 | 60.3 | 18.6 | 14.9 | trichloroethylene, | 12.9 | 56.5 | 17.4 | 14.0 | 12.1 | 1 |
| 10 | 60.3 | 18.6 | 14.9 | tetrachloroethylene, | 16.2 | 54.8 | 16.9 | 13.6 | 14.7 | 1 |
| 11 | 60.3 | 18.6 | 14.9 | 1,5-octadiene, | 10.6 | 57.8 | 17.8 | 14.3 | 10.2 | 1 |
| 12 | 60.3 | 18.6 | 14.9 | cycloheptatriene, | 9.0 | 58.7 | 18.1 | 14.5 | 8.8 | 1 |
| 13 | 60.3 | 18.6 | 14.9 | phenylacetylene, | 10.0 | 58.1 | 17.9 | 14.4 | 9.6 | 1 |
| 14 | 60.3 | 18.6 | 14.9 | hexene-1, | 4.0 | 61.7 | 19.0 | 15.2 | 4.1 | 1 |
| 15 | 60.3 | 18.6 | 14.9 | hexene-1, | 8.0 | 59.2 | 18.3 | 14.6 | 7.9 | 1 |
| 16 | 60.3 | 18.6 | 14.9 | hexene-1, | 12.0 | 57.0 | 17.6 | 14.1 | 11.3 | 1 |
| 17 | 60.3 | 18.6 | 14.9 | hexene-1, | 12.0 | 57.0 | 17.6 | 14.1 | 11.3 | 1 |
| 18 (1) | 60.3 | 18.6 | 4.94 | hexene-1, | 8.0 | 65.7 | 20.3 | 5.4 | 8.7 | 2.9 |
| 19 (1) | 60.3 | 18.6 | 9.8 | hexene-1, | 8.0 | 62.4 | 19.2 | 10.1 | 8.3 | 1.5 |
| 20 | 60.3 | 18.6 | 22.4 | hexene-1, | 8.0 | 55.2 | 17.0 | 20.5 | 7.3 | 0.66 |
| 21 | 60.3 | 18.6 | 14.9 | hexene-1, | 8.0 | 59.2 | 18.3 | 14.6 | 7.9 | 1 |
| 22 (4) | 60.3 | 18.6 | 7.35 | hexene-1, | 6.7 | 64.9 | 20.0 | 7.9 | 7.2 | 2 |
| 23 (4) | 60.3 | 18.6 | 3.67 | hexene-1, | 6.7 | 67.5 | 20.8 | 4.1 | 7.5 | 4 |
| 24 (6) | 64.3 | 19.8 | 15.86 | no HC | | 64.3 | 19.8 | 15.9 | 0 | 1 |
| 25 (6) | 77.1 | 23.9 | 19.0 | durene, | 10.0 | 59.3 | 18.4 | 14.6 | 7.7 | 1 |

(1) cooling employed during milling
(2) analysis, wt. %
    neohexene    95.62
    3-methylbutene-1    0.04
    2-methylbutene-1    0.21
    2-methylbutene-2    0.60
    trans-pentene-2    0.20
    2,3-dimethylbutene-1    3.04
    2,3-dimethylbutene-2    0.12
    2,2-dimethylbutene-1    0.17
(3) analysis, wt. %
    2,4,4-trimethylpentene-1    74.4
    2,4,4-trimethylpentene-2    21.4
    dimer    4.0
    lights    0.2
    51 ppm 2,6-di-t-butyl-4-methylphenol
(4) milled MgCl$_2$ and TiCl$_4$ for 24 hours, added EB and hexene-1 and milled 1 more hour.
(5) not applicable
(6) control.

In each of a series (except Run 126) of propylene polymerization runs, a dry, air-free, 1 gallon (3.8 liter) stirred stainless steel reactor was charged at room temperature (about 25° C.), under a gaseous propylene flush, with catalyst components (B) ethyl anisate (EA), triethylaluminum (TEA) as a 15 wt. % solution in n-hexane, about 0.9 liters of hydrogen (STP), and about 1.5 liters of liquid propylene. Catalyst component (A) then was flushed in with liquid propylene.

The reactor and contents were heated to 150° F. (66° C.) as additional propylene was added to obtain liquid full conditions. Polymerization was continued for 1 hour at 150° F. with intermittent addition of propylene as required to maintain a liquid full condition.

The reactor and contents then were cooled to about 70° F. (21° C.), 10 cc of methanol added and mixed with the contents, and the mixture drained into a receiver. The polymer was isolated and dried at ambient conditions.

In Run 126, the reactor was charged at room temperature under a gaseous propylene flush with catalyst component (C), diethylaluminum chloride (DEAC), catalyst component (A), about 0.9 liter hydrogen (STP) and about 2 liters of liquid propylene. The reactor and contents were heated to 125° F. (52° C.) and catalyst component (B), EA and TEA, flushed in with liquid propylene. The reactor and contents were heated to 150° F. as additional propylene was added to obtain a liquid full condition. Polymerization and isolation of the polymer took place as previously described.

Propylene-soluble polymer remaining in the liquid propylene was determined by flashing the propylene and weighing the residue, and comparing the amount vs. the total polymer produced (solid polymer+xylene-solubles+propylene-solubles). Xylene-soluble polymer is the amount of polymer recovered (isolated) from the reactor (excluding propylene-solubles) that remains in solution after dissolving the isolated polymer in hot xylene and cooling to room temperature. Calculated productivity is given in terms of grams of recovered polymer produced per gram of catalyst component (A) per hour, and as grams of polymer recovered per gram of titanium (Ti) per hour, excluding propylene-soluble material. Productivity is based on the polymer recovered from the reactor, i.e., the solid substantially crystalline polymer plus the xylenes-soluble polymer. Propylene-solubles is not included.

The quantities of catalyst components employed, atom ratios of aluminum (Al) to titanium used, mole ratios of TEA:EA, and results obtained are presented in Tables II and III. In Runs 102–106 and 108–132, a TEA:EA mole ratio of 2.95 was employed. In Run 100, a TEA:EA mole ratio of 3.12 was employed. In Run 107, a TEA:EA mole ratio of 3.14 was employed. In Run 126, a TEA:DEAC:EA mole ratio of 2.95:1.63:1.00 was employed. In Run 126, the Al:Ti atom ratio resulting from aluminum contributed by the DEAC was 34.1 and the total Al-Ti atom ratio resulting from both aluminum compounds was 109.

Inspection of the data presented in Table II shows that the incorporation of an unsaturated organic compound of the described types with catalyst component (A) yields an active propylene polymerization catalyst. The inventive runs, except for Runs 118 and 119, are also characterized by the formation of less propylene-soluble polymer than with a control catalyst of Runs 100-103 containing no unsaturated compound in catalyst component (A).

The results in inventive Runs 120-124 indicate that hexene-1 concentrations in catalyst component (A) ranging from about 4 to 11 wt. % all yielded active catalysts producing less propylene soluble polymer than shown in control Runs 100-103.

The effect of the EB level in catalyst component (A) is shown in Runs 125, 127-128 and the results suggest that an EB level above about 5 wt. % and ranging from about 10 to 20.5 wt. % is desirable to reduce propylene Table II

| Run No. | Comp. (A) Run No. | Catalyst Comp. (A) mg | Ti mg | Ti ma(4) | Catalyst (B) TEA mm(5) | Catalyst (B) EA mm(5) | Atom Ratio Al/Ti | Polymer Yield g | Calc. Prod. g/g Ti | Calc. Prod. g/g Comp. (A) | Solubles, Wt. % Xylene | Solubles, Wt. % Propylene |
|---|---|---|---|---|---|---|---|---|---|---|---|---|
| 100-C(1) | 24 | 44.8 | 2.24 | .0468 | 3.24 | 1.04 | 69 | 310 | 138,000 | 6920 | 3.8 | 5.5 |
| 101-C | 24 | 70.1 | 3.50 | .0731 | 6.32 | 2.14 | 87 | 464 | 133,000 | 6620 | 3.4 | 4.3 |
| 102-C | 24 | 89.0 | 4.50 | .0939 | 6.32 | 2.14 | 67 | 387 | 86,000 | 4350 | 3.3 | 4.7 |
| 103-C | 24 | 67.8 | 3.39 | .0708 | 6.32 | 2.14 | 89 | 391 | 115,000 | 5770 | 4.1 | 4.6 |
| 104-I(2) | 1 | 56.0 | 2.80 | .0585 | 6.32 | 2.14 | 108 | 423 | 151,000 | 7550 | 3.3 | 3.6 |
| 105-I | 2 | 50.6 | 2.33 | .0486 | 6.32 | 2.14 | 130 | 325 | 139,000 | 6420 | 2.9 | 4.1 |
| 106-I | 3 | 56.2 | 2.60 | .0542 | 6.32 | 2.14 | 117 | 450 | 173,000 | 8010 | 3.1 | 2.6 |
| 107-I | 3 | 40.5 | 1.87 | .0390 | 2.89 | 0.92 | 74 | 286 | 153,000 | 7060 | 3.7 | 3.4 |
| 108-I | 4 | 70.6 | 3.87 | .0808 | 6.32 | 2.14 | 78 | 434 | 112,000 | 6150 | 4.3 | 2.9 |
| 109-I | 5 | 72.6 | 3.35 | .0699 | 6.32 | 2.14 | 90 | 512 | 153,000 | 7050 | 4.0 | 3.0 |
| 110-C(3) | 6 | 106.7 | 5.77 | .1205 | 6.32 | 2.14 | 52 | 659 | 114,000 | 6180 | 6.5 | 5.3 |
| 111-I | 7 | 76.6 | 3.54 | .0739 | 6.32 | 2.14 | 86 | 510 | 144,000 | 6660 | 2.6 | 3.2 |
| 112-I | 7 | 80.4 | 3.72 | .0777 | 6.32 | 2.14 | 81 | 478 | 128,000 | 5950 | 5.8 | 1.8 |
| 113-I | 7 | 90.2 | 4.17 | .0871 | 6.32 | 2.14 | 73 | 615 | 147,000 | 6820 | 5.5 | 2.8 |
| 114-I | 8 | 95.9 | 4.29 | .0896 | 6.32 | 2.14 | 70 | 114 | 26,600 | 1190 | 4.1 | 3.4 |
| 115-I | 9 | 81.0 | 3.56 | .0743 | 6.32 | 2.14 | 85 | 350 | 98,300 | 4320 | 3.1 | 3.3 |
| 116-I | 10 | 116.7 | 4.98 | .1040 | 6.32 | 2.14 | 61 | 525 | 105,000 | 4500 | 3.8 | 2.8 |
| 117-I | 11 | 97.6 | 4.39 | .0916 | 6.32 | 2.14 | 69 | 479 | 109,000 | 4940 | 3.7 | 3.0 |
| 118-I | 12 | 67.5 | 3.08 | .0643 | 6.32 | 2.14 | 98 | 307 | 99,700 | 4550 | 3.3 | 4.4 |
| 119-I | 13 | 59.5 | 2.69 | .0562 | 6.32 | 2.14 | 112 | 308 | 114,000 | 5180 | 3.2 | 5.0 |
| 120-I | 14 | 72.4 | 3.47 | .0724 | 6.32 | 2.14 | 87 | 490 | 141,000 | 6770 | 3.2 | 3.4 |
| 121-I | 15 | 71.0 | 3.28 | .0685 | 6.32 | 2.14 | 92 | 459 | 140,000 | 6460 | 3.7 | 2.8 |
| 122-I | 15 | 98.2 | 4.54 | .0948 | 6.32 | 2.14 | 67 | 644 | 142,000 | 6560 | 3.0 | 2.4 |
| 123-I | 16 | 73.8 | 3.28 | .0685 | 6.32 | 2.14 | 92 | 365 | 111,000 | 4950 | 3.8 | 2.7 |
| 124-I | 17 | 64.4 | 2.86 | .0597 | 6.32 | 2.14 | 106 | 503 | 176,000 | 7810 | 3.9 | 3.3 |
| 125-1 | 18 | 78.0 | 4.00 | .0835 | 6.32 | 2.14 | 76 | 670 | 168,000 | 8590 | 7.8 | 4.4 |
| 126-I | 19 | 43.0 | 2.08 | .0434 | 3.24 | 1.10 | 75 | 459 | 221,000 | 10670 | 7.0 | 3.0 |
| 127-I | 19 | 58.5 | 2.84 | .0593 | 6.32 | 2.14 | 107 | 415 | 146,000 | 7090 | 7.8 | 2.8 |
| 128-I | 20 | 59.6 | 2.56 | .0534 | 6.32 | 2.14 | 118 | 274 | 107,000 | 4600 | nd(6) | 3.2 |
| 129-I | 21 | 65.3 | 3.02 | .0630 | 6.32 | 2.14 | 100 | 488 | 162,000 | 7470 | 8.2 | 3.0 |
| 130-I | 22 | 64.1 | 3.24 | .0676 | 6.32 | 2.14 | 94 | 340 | 105,000 | 5300 | 5.8 | 6.3 |
| 131-I | 23 | 88.2 | 4.63 | .0967 | 6.32 | 2.14 | 65 | 599 | 129,000 | 6790 | 6.8 | 6.7 |
| 132-C | 25 | 98.0 | 4.55 | .0950 | 6.32 | 2.14 | 51 | 575 | 126,000 | 5870 | 3.9 | 2.2 |

(1)C = control run
(2)I = inventive run
(3)Control run, no EB
(4)ma = milliatom
(5)mm = millimoles
(6)not determined.

However, Run 118 containing cycloheptatriene in catalyst component (A), and Run 119 containing phenylacetylene in catalyst component (A), are both approximately equivalent to the control catalyst in productivity and solubles in propylene polymerization. Run 110 is a control run for inventive Runs 111-113. The beneficial effects of ethyl benzoate upon depressing solubles, particularly propylene solubles, and increasing catalyst productivity are demonstrated in Runs 111-113 of this series.

EXAMPLE II

Due to the ready availability of hexene-1, it was decided to utilize that compound as the preferred compound. In a series of catalysts its concentration was varied, the EB concentration was varied and manner of preparation of catalyst component (A) was varied.

The results of that study are shown in Table II along with the results obtained from control catalyst 25 from Table I.

soluble polymer. Run 126 demonstrates that the use of catalyst component (C) DEAC greatly boosts catalyst productivity at low propylene soluble polymer levels although the amount of xylene soluble polymer produced is somewhat increased. Run 129 is a run similar to Run 121. While an abnormally high amount of xylene soluble polymer is shown in Run 129, this is believed to be uncharacteristic of this catalyst system in view of the other runs shown. Runs 130 and 131 demonstrates that catalyst component (A) should be prepared by milling all its components together for greater than 1 hour and more preferably about 10 to 50 hours in order to achieve an active catalyst that produces a minimum amount of propylene soluble polymer.

Run 132 is made with a comparison catalyst and it is compared with Run 122 using an invention catalyst, all showing similar amounts of titanium, magnesium chloride, ethyl benzoate and organic compound in catalyst component (A) and similar amounts of catalyst component (B). Almost identical amounts of catalyst was used in each polymerization run. Both catalyst systems are active and both reduce propylene soluble polymer during propylene polymerization. The difference between them lies in polymer productivity. Thus, the inventive catalyst produced more insoluble polypropylene per unit time than the control catalyst, with both catalysts producing about the same quantity of soluble polymer.

EXAMPLE III

An invention catalyst component (A) consisting of calculated weight percentages for each component as follows: magnesium chloride, 60.9, titanium tetrachloride, 18.8, ethyl benzoate, 12.3 and hexene-1, 8.0 was prepared by ball milling in a vibrating mill as before for a period of 48 hours. The catalyst was used along with TEA plus EB as catalyst component (B) in Run 133 and with TEA plus EB as catalyst component (B) along with DEAC as catalyst component (C) in Run 134 to polymerize propylene in a 26 gallon (0.099 m³) loop reactor at 140° F. (60° C.). The conditions used and results obtained are given in Table III.

Table III

| Propylene Polymerization in Loop Reactor | | |
|---|---|---|
| Run No. | 133 | 134 |
| Catalyst Component 2 | TEA:EB | TEA-EB |
| Catalyst Component 3 | 0 | DEAC |
| Metal Alkyl | | |
| Lbs./100 lbs. liquid propylene | 0.127 | 0.053 |
| TEA:EB:DEAC, Mole Ratio | 3.04:1:0 | 1.38:1:1.38 |
| Residence Time, Hours | 1.96 | 1.93 |
| Catalyst Productivity | | |
| Lbs. Polymer/Lb. Catalyst | 4440 | 6180 |
| Metal Alkyl Productivity | | |
| Lbs. Polymer/Lb. Alkyl | 300 | 770 |
| Melt Flow[(1)] | 6.6 | 11.2 |
| Flexural Modulus X10$^{-3}$ psi[(2)] | 227 | 219 |
| Xylene Solubles, Wt. % | 3.8 | 3.6 |

[(1)]ASTM D1238-65T, Condition L
[(2)]ASTM D790-66.

The results in Run 133 indicate that the inventive catalyst is active and that it can be employed in a loop reactor to produce good quality polypropylene at high productivity levels. The beneficial effect of DEAC in productivity is demonstrated in Run 134.

EXAMPLE IV

An inventive catalyst component (A) was prepared consisting of calculated weight percentages for each component as follows: magnesium chloride 60.5, titanium tetrachloride 18.1, ethyl benzoate 13.9, and hexene-1 7.5. The catalyst was prepared as before in a vibrating mill by ball milling for a period of 24 hours.

A dry, air-free, 1 gallon stirred stainless steel reactor was charged at room temperature with 2.7 mmoles TEA, (no Lewis base was employed), 28.7 mg catalyst (equivalent to 1.31 mg Ti or 0.027 milliatoms), and 2 liters of isobutane. Ethylene was charged as the reactor and the contents were heated to about 175° F. (79° C.) sufficient to give a total pressure of 280 psig (1930 kPa gage), and polymerization continued for 1 hour with sufficient ethylene being admitted on demand to maintain a pressure of 280 psig. The reaction was terminated by venting out the gaseous components and recovering the polymer.

The yield of solid polyethylene was 92 g amounting to the production of 3200 grams polyethylene per gram of catalyst component (A) per hour of 70,200 grams polyethylene per gram titanium per hour.

The polymerization results demonstrate that the inventive catalyst component (A) in combination with TEA is active for ethylene polymerization.

The disclosure, including data, have illustrated the value and effectiveness of my invention. The examples, the knowledge and background of the field of the invention and the general principles of chemistry and other applicable sciences have formed the bases from which the broad descriptions of the invention including the ranges of conditions and the generic groups of operant components have been developed, and have formed the bases for my claims here appended.

I claim:

1. A process for the polymerization of at least one alpha-monoolefin monomer which comprises polymerizing said at least one alpha-monoolefin monomer under polymerization conditions employing a catalyst system which comprises (A) a milled admixture of effective ratios of a tetravalent titanium halide, magnesium or manganous chloride, a first Lewis base, and a non-aromatic unsaturated hydrocarbon aliphatic or alicyclic compound, (B) a trihydrocarbyl aluminum compound, optionally with a second Lewis base, and optionally including (C) a dihydrocarbyl aluminum halide, employing catalytically effective ratios of B:A, and of C, where employed, wherein said titanium halide is represented by $TiX_{4-n}R'_n$ wherein X is a halogen and is bromine, chlorine, or iodine, R' is an alkyl, cycloalkyl, aryl, aryloxy, alkoxy, or combination radical of 2 to 8 carbon atoms, and n is zero or an integer of 1, 2, or 3.

2. The polymerization process according to claim 1 employing a catalyst system consisting essentially of said (A) and said (B) wherein said (B) includes said second Lewis base.

3. The polymerization process according to claim 1 employing a catalyst system consisting essentially of said (A), said (B) including said second Lewis base, and said (C).

4. The polymerization process according to claim 1 wherein said titanium halide is at least one of titanium tetrachloride, trichloro-n-octyltitanium, trichlorophenoxytitanium, dibromodimethyl titanium, tribromocyclohexyltitanium, iodotriethoxy titanium, or trichlorocyclohexyloxytitanium.

5. The polymerization process according to claim 1 wherein said first Lewis base and where employed said second Lewis base is an amine, amide, ether, ester, ketone, nitrile, carboxylic acid, phosphine, or mixture thereof.

6. The polymerization process according to claim 5 wherein said Lewis base is an aliphatic carboxylic acid, aromatic carboxylic acid, alkylester of aliphatic carboxylic acid, alkylester of aromatic carboxylic acid, aliphatic ether, aromatic ether, aliphatic ketone, aromatic ketone, aliphatic aldehyde, aliphatic alcohol, aromatic alcohol, aliphatic acid halide, aliphatic nitrile, aromatic nitrile, aliphatic amine, aromatic amine, aliphatic phosphine, aromatic phosphine, amide, combination, or mixture thereof.

7. The polymerization process according to claim 5 wherein said Lewis base is an ester and is an ester of an aliphatic alcohol with an aromatic carboxylic acid represented by the formula:

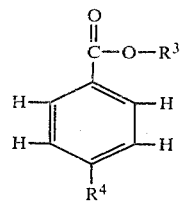

wherein R³ is an alkyl group of 1 to 4 carbon atoms; R⁴ is a para-substituent on the ring and is a monovalent radical selected from the group consisting of —H, —F, —Cl, —Br, —I, —OH, —OR², —OOCR², —SH, —NH₂, —NHR², —NR₂², —NR²COR², NR²COR², —NHCOR², —NO₂, —CN, —CHO, —COR², —COOR², —CONH₂, —CONR₂², —SO₂R², and —CX₃' wherein R² is a hydrocarbyl group and X'=F, Cl, Br, I, or hydrogen.

8. The polymerization process according to claim 6 wherein said Lewis base is triethylamine, triphenylamine, diphenylamine, acetamide, butyramide, acetanilide, dimethyl ether, diethyl ether, ethyl butyl ether, diphenyl ether, acetic acid, benzoic acid, acetone, methyl n-butyl ketone, acetophenone, acetonitrile, isobutyronitrile, benzonitrile, tributylphosphine, propyl-(n-pentyl)phosphine, triphenylphosphine, ethyl benzoate, ethyl anisate (p-methoxybenzoate), ethyl p-dimethylaminobenzoate, ethyl p-fluorobenzoate, ethyl p-cyanobenzoate, methyl benzoate, isopropyl p-diethylaminobenzoate, butyl p-fluorobenzoate, n-propyl p-cyanobenzoate, ethyl p-trifluoromethylbenzoate, methyl p-hydroxybenzoate, ethyl p-methoxycarbonylbenzoate, methyl p-acetylbenzoate, isopropyl p-formylbenzoate, methyl p-nitrobenzoate, ethyl p-carbamoylbenzoate, methyl p-mercaptobenzoate, methyl-p-chlorobenzoate, n-butyl-p-bromobenzoate, isopropyl-p-iodobenzoate, ethyl-p-aminobenzoate, n-propyl-p-methylaminobenzoate, methyl-p-acetamidobenzoate, n-butyl-p-formylbenzoate, dimethyl terephthalate, ethyl-p-(N,N-dimethylcarbamoyl)benzoate, n-propyl-p-(methylsulfonyl)benzoate, methyl-p-trifluoromethylbenzoate, ethyl-p-acetoxybenzoate, or mixture thereof.

9. The polymerization process according to claim 8 wherein said Lewis base is ethyl anisate or ethyl benzoate.

10. The polymerization process according to claim 5 wherein said unsaturated compound contains 2 to 20 carbon atoms per molecule.

11. The polymerization process according to claim 10 wherein said unsaturated compound is ethylene, propylene, hexene-1, 4-methyl-cis-pentene-2, 2,3-dimethylbutene-1, neohexene, octene-1, diisobutylene, dodecene-1, 1,5-octadiene, 1,3,5-heptatriene, heptyne-1, hexyne-1, or mixture.

12. The polymerization process according to claim 5 wherein said (B) trihydrocarbylaluminum compound is represented by AlR₃² wherein R² is an alkyl or cycloalkyl hydrocarbon radical of 1 to 12 carbon atoms or an aryl hydrocarbon radical of 6 to 12 carbon atoms, and said (B) component further includes said second Lewis base selected from said first Lewis bases.

13. The polymerization process according to claim 12 wherein said trihydrocarbylaluminum compound is trimethylaluminum, triethylaluminum, tri-n-dodecylaluminum, dimethylethylaluminum, triphenylaluminum, or admixture.

14. The polymerization process according to claim 12 employing in said (B) a mole ratio of about 0.5:1 to 100:1 trihydrocarbylaluminum compound:second Lewis base.

15. The polymerization process according to claim 14 wherein said second Lewis base is an ester, and is ethyl anisate or ethyl benzoate.

16. The polymerization process according to claim 14 employing a weight ratio of about 1 to 20 weight percent of said unsaturated compound relative to the total of unsaturated compound plus other components in said (A).

17. The polymerization process according to claim 5 employing said component (C) which is a dialkylaluminum halide and is represented by AlR₂⁵X, wherein each R⁵ is an alkyl radical of 1 to 12 carbon atoms, and X' is a halogen and is fluorine, chlorine, bromine, or iodine.

18. The polymerization process according to claim 17 wherein said dialkylaluminum halide is dimethylaluminum bromide, diethylaluminum chloride, diethylaluminum fluoride, di-n-propylaluminum iodide, ethyl-t-butylaluminum bromide, bis-(2-ethylhexyl)aluminum chloride, bis-n-dodecylaluminum chloride, or mixture thereof.

19. The polymerization process according to claim 1 employing said component (C) and employing a weight ratio of (A):(B) of about 0.01:1 to 0.5:1, a mole ratio of (C):(B) in the range of about 0.05:1 to 20:1, and a mole ratio of said (C):titanium halide in the range of about 0.05:1 to 200:1.

20. The polymerization process according to claim 1 employing in said catalyst system component (A) a weight ratio of magnesium or manganous chloride:titanium halide of about 4:1 to 40:1, and about 1 to 20 weight percent unsaturated compound based on total weight of said (A);
employing said second Lewis base in said (B) and employing a molar ratio of about 0.5:1 to 100:1 trihydrocarbylaluminum compound:second Lewis base;
employing a weight ratio of (A):(B) of about 0.01:1 to 0.5:1;
employing said (C) and employing a molar ratio of (C) dihydrocarbylaluminum halide:titanium halide of about 0.5:1 to 200:1; and
employing a molar ratio of (C):(B) of about 0.5:1 to 20:1.

21. The polymerization process according to claim 20 employing in said catalyst system component (A) a weight ratio of magnesium or manganous chloride:titanium halide of about 5:1 to 20:1, and about 1.5 to 15 weight percent unsaturated compound based on total weight of said (A);
employing in said (B) a molar ratio of about 1:1 to 8:1 trihydrocarbylaluminum compound:second Lewis base;
employing a weight ratio of (A):(B) of about 0.02:1 to 0.3:1;
employing a molar ratio of (C) dihydrocarbylaluminum halide:titanium halide of said (A) of about 2:1 to 150:1; and
employing a molar ratio of (C):(B) of about 0.25:1 to 4:1.

22. The polymerization process according to claim 1 employing a catalyst system consisting essentially of said (A) and said (B) wherein said (B) is said trihydrocarbyl aluminum compound.

23. The polymerization process according to claim 21 wherein said manganous or magnesium chloride is magnesium chloride, said first Lewis base is said ester and is ethylbenzoate, said titanium halide is titanium tetrachloride, and said unsaturated compound is propylene, neohexene, octene-1, 4-methylpentene-1, 4-methylpentene-2, diisobutylene, 1,5-octadiene, cycloheptatriene, or hexene-1.

24. The polymerization process according to claim 21 wherein said manganous or magnesium chloride is magnesium chloride, said first Lewis base is said ester and is ethylbenzoate, said titanium halide is titanium tetrachloride, and said unsaturated compound is hexene-1.

25. The polymerization process according to claim 1 wherein said aliphatic alpha-monoolefin is represented by $RCH=CH_2$ wherein R is hydrogen or an alkyl radical.

26. The polymerization process according to claim 25 wherein said alpha-monoolefin monomer is ethylene, propylene, butene-1, isobutylene, 3-methylbutene-1, pentene-1, hexene-1, octene-1, decene-1, or admixture thereof.

27. The polymerization process according to claim 26 wherein said monomer is ethylene, or ethylene with another said alpha-monoolefin, and wherein said catalyst system consists essentially of said (A) and said (B).

28. The polymerization process according to claim 26 wherein said alpha-monoolefin is propylene, and said catalyst system consists essentially of said (A), said (B) wherein said (B) is limited to said trihydrocarbylaluminum, and said (C).

29. The polymerization process according to claim 28 employing a ratio of about 0.001 to 1 weight percent total of catalyst component (A) relative to the total reaction mixture including catalyst and alpha-monoolefin, and further including diluent where employed.

30. The polymerization process according to claim 29 wherein said polymerization is conducted under polymerization conditions at a temperature in the range of about $-80°$ C. to $+150°$ C.

31. The polymerization process according to claim 30 including said diluent and said diluent is n-butane, isobutane, pentane, n-hexane, n-heptane, n-octane, cyclohexane, methylcyclohexane, or mixture thereof.

32. The polymerization process according to claim 30 wherein said (A) is titanium tetrachloride, magnesium chloride, ethyl benzoate, and said unsaturated compound which is propylene, neohexene, octene-1, 4-methylpentene-1, 4-methylpentene-2, diisobutylene, 1,5-octadiene, cycloheptatriene, or hexene-1,
said (B) is triethylaluminum and ethyl anisate,
said component (C) is diethylaluminum chloride and ethyl benzoate or ethyl anisate,
and said polymerizable alpha-monoolefin is propylene.

33. The polymerization process according to claim 30 wherein said catalyst component (A) is magnesium chloride, titanium tetrachloride, ethyl benzoate, and hexene-1,
said (B) is triethylaluminum and ethyl benzoate,
said (C) is diethylaluminum chloride,
and wherein said polymerizable monoolefin is propylene.

34. The polymerization process according to claim 1 further employing minor amounts of hydrogen during polymerization effective to exercise control of molecular weight of the resulting polymer.

35. A polymerization process according to claim 10 wherein said unsaturated compound is a monoolefin.

36. A polymerization process according to claim 35 wherein said titanium halide is titanium tetrachloride and said Lewis base in (A) is an ester of the formula

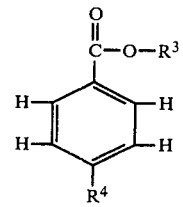

wherein $R^3$ is an alkyl group of 1 to 4 carbon atoms and $R^4$ is a monovalent radical selected from $-H$ and $-OCH_3$.

37. A polymerization process according to claim 36 wherein said unsaturated compound is 1-hexene or 1-octene.

38. A polymerization process according to claim 30 wherein said unsaturated compound is selected from monoolefins having 2 to 20 carbon atoms, said titanium halide is titanium tetrachloride, and said Lewis base in (A) is an ester of the formula

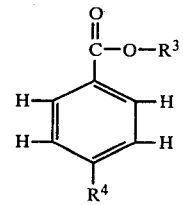

wherein $R^3$ is an alkyl group of 1 to 4 carbon atoms and $R^4$ is a monovalent radical selected from $-H$ and $-OCH_3$.

* * * * *

UNITED STATES PATENT AND TRADEMARK OFFICE
CERTIFICATE OF CORRECTION

PATENT NO. : 4,242,480
DATED : December 30, 1980
INVENTOR(S) : M. Bruce Welch

It is certified that error appears in the above-identified patent and that said Letters Patent are hereby corrected as shown below:

Column 15, line 15, "$NR^2COR^2$" second occurrence should be deleted.

Column 16, line 14, delete "$AlR_2^5X$" and insert therefor --- $AlR_2^5X'$ ---.

Column 16, lines 21 and 22, delete "bis-(2-ethylhexyl-)aluminum" and insert therefor --- bis-(2-ethylhexyl)aluminum ---.

Signed and Sealed this

First Day of December 1981

[SEAL]

Attest:

GERALD J. MOSSINGHOFF

Attesting Officer

Commissioner of Patents and Trademarks